US011433798B2

(12) United States Patent
Kaneko et al.

(10) Patent No.: US 11,433,798 B2
(45) Date of Patent: Sep. 6, 2022

(54) ARTICLE STORAGE SYSTEM, INFORMATION PROCESSING APPARATUS, AND INFORMATION PROCESSING METHOD

(71) Applicant: Toyota Jidosha Kabushiki Kaisha, Toyota (JP)

(72) Inventors: Yusuke Kaneko, Nagoya (JP); Masato Endo, Nagakute (JP); Shinji Sassa, Ama (JP); Takahiro Shiga, Chiryu (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/257,307

(22) Filed: Jan. 25, 2019

(65) Prior Publication Data
US 2019/0235507 A1    Aug. 1, 2019

(30) Foreign Application Priority Data

Jan. 30, 2018  (JP) .............................. JP2018-014028

(51) Int. Cl.
*B60P 3/00*       (2006.01)
*B60W 60/00*    (2020.01)
(Continued)

(52) U.S. Cl.
CPC ....... *B60P 3/007* (2013.01); *B60W 60/00256* (2020.02); *B65G 1/065* (2013.01);
(Continued)

(58) Field of Classification Search
CPC .... B60P 3/007; B60R 5/00; B60W 60/00256; B65G 1/065; B66F 9/063; G05B 15/02;
(Continued)

(56) References Cited

U.S. PATENT DOCUMENTS 9,256,852 B1\* 2/2016 Myllymaki .......... G06Q 10/083
2007/0143207 A1\* 6/2007 Breen .................. G06Q 20/102
705/40
(Continued)

FOREIGN PATENT DOCUMENTS

CN      103544591 A      1/2014
CN      104156843 A      11/2014
(Continued)

OTHER PUBLICATIONS

"Outline of Vehicle Renting", China Urban Taxi Association, pp. 69-70, Jan. 1997 (Partial Translation of Office Action dated Sep. 2, 2021 in CN201910080409.1 provided).

*Primary Examiner* — Thomas Randazzo
(74) *Attorney, Agent, or Firm* — Dinsmore & Shohl LLP

(57) ABSTRACT

An article storage system includes a moving object configured to house an article and move on a road, and a server configured to manage information of the moving object and information of a user who uses the moving object, store user identification information for identifying the user and moving object identification information for identifying the moving object used by the user in association with each other, acquire a request from the user relating to housing of the article in the moving object or take-out of the article
(Continued)

from the moving object, and when the request from the user is acquired, specify the moving object to be used by the user based on the user identification information and the moving object identification information and perform control such that the specified moving object moves from a predetermined place on the road to a place that is different from the predetermined place.

12 Claims, 8 Drawing Sheets

(51) Int. Cl.
| | |
|---|---|
| G05D 1/02 | (2020.01) |
| B65G 1/06 | (2006.01) |
| G05B 15/02 | (2006.01) |
| G06Q 30/06 | (2012.01) |
| G06Q 10/08 | (2012.01) |
| B66F 9/06 | (2006.01) |
| B60R 5/00 | (2006.01) |

(52) U.S. Cl.
CPC .............. *B66F 9/063* (2013.01); *G05B 15/02* (2013.01); *G05D 1/021* (2013.01); *G05D 1/0212* (2013.01); *G05D 1/0287* (2013.01); *G05D 1/0297* (2013.01); *G06Q 10/08* (2013.01); *G06Q 30/0645* (2013.01); *B60R 5/00* (2013.01); *G05D 2201/0213* (2013.01); *G05D 2201/0216* (2013.01)

(58) Field of Classification Search
CPC .... G05D 1/021; G05D 1/0212; G05D 1/0287; G05D 1/0297; G05D 2201/0213; G05D 2201/0216; G06Q 10/08; G06Q 30/0645
See application file for complete search history.

(56) References Cited

U.S. PATENT DOCUMENTS

| | | | | |
|---|---|---|---|---|
| 2015/0006005 | A1* | 1/2015 | Yu | G06Q 50/28 |
| | | | | 701/22 |
| 2015/0348179 | A1* | 12/2015 | Kamisawa | G08G 1/205 |
| | | | | 705/5 |
| 2017/0139413 | A1* | 5/2017 | James | G06Q 10/00 |
| 2018/0065808 | A1* | 3/2018 | James | G06Q 10/08 |
| 2018/0208398 | A1* | 7/2018 | Haveman | G05D 1/0225 |
| 2018/0297781 | A1* | 10/2018 | Alkhaldi | B60P 3/00 |
| 2018/0326886 | A1* | 11/2018 | Sibley | G06Q 10/0832 |
| 2019/0043001 | A1* | 2/2019 | Woulfe | G01C 21/3438 |
| 2019/0047801 | A1* | 2/2019 | Pinilla Pico | B65G 67/04 |
| 2019/0049988 | A1* | 2/2019 | Meij | G05D 1/0274 |
| 2019/0049995 | A1* | 2/2019 | Ferguson | G06N 20/00 |
| 2019/0180354 | A1* | 6/2019 | Greenberger | G06Q 20/10 |
| 2020/0090121 | A1* | 3/2020 | Gupta | G06Q 10/047 |
| 2020/0247302 | A1* | 8/2020 | Buttolo | G06Q 10/083 |

FOREIGN PATENT DOCUMENTS

| | | |
|---|---|---|
| JP | 2002279050 A | 9/2002 |
| JP | 2004100233 A | 4/2004 |
| JP | 2004171473 A | 6/2004 |
| JP | 2008030942 A | 2/2008 |
| JP | 2017081557 A | 5/2017 |

\* cited by examiner

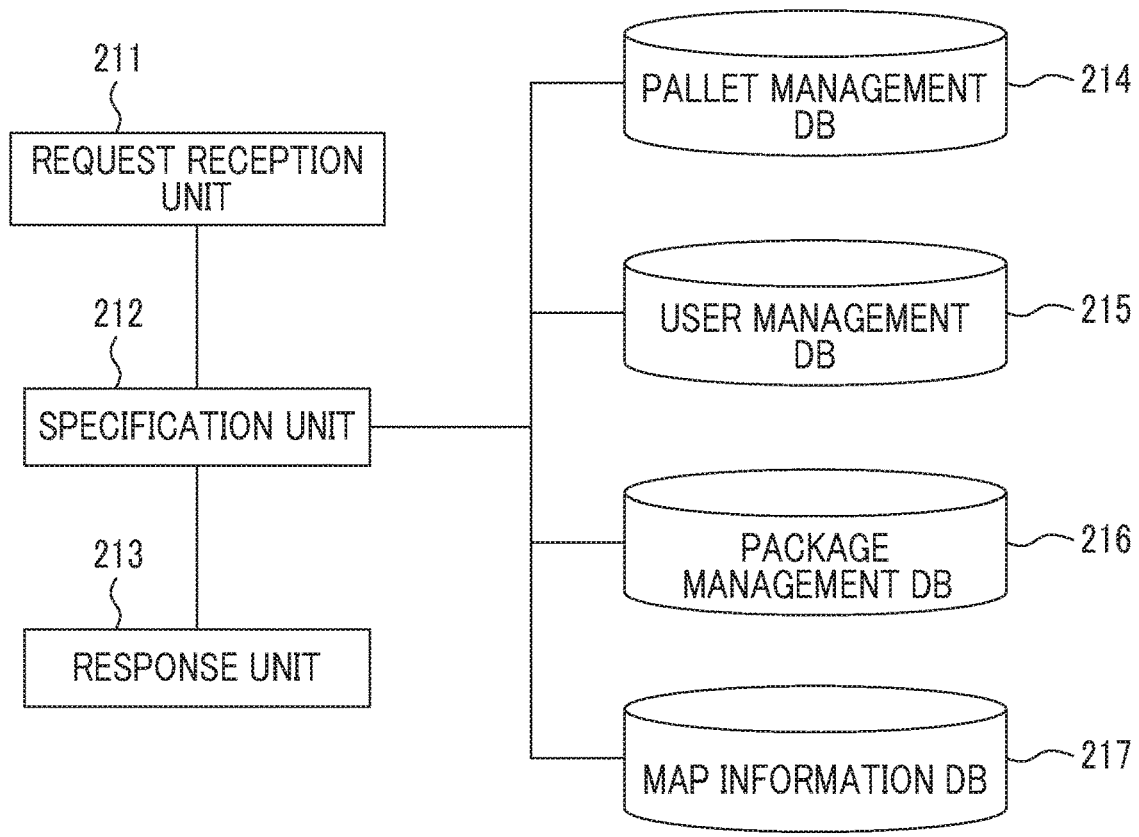

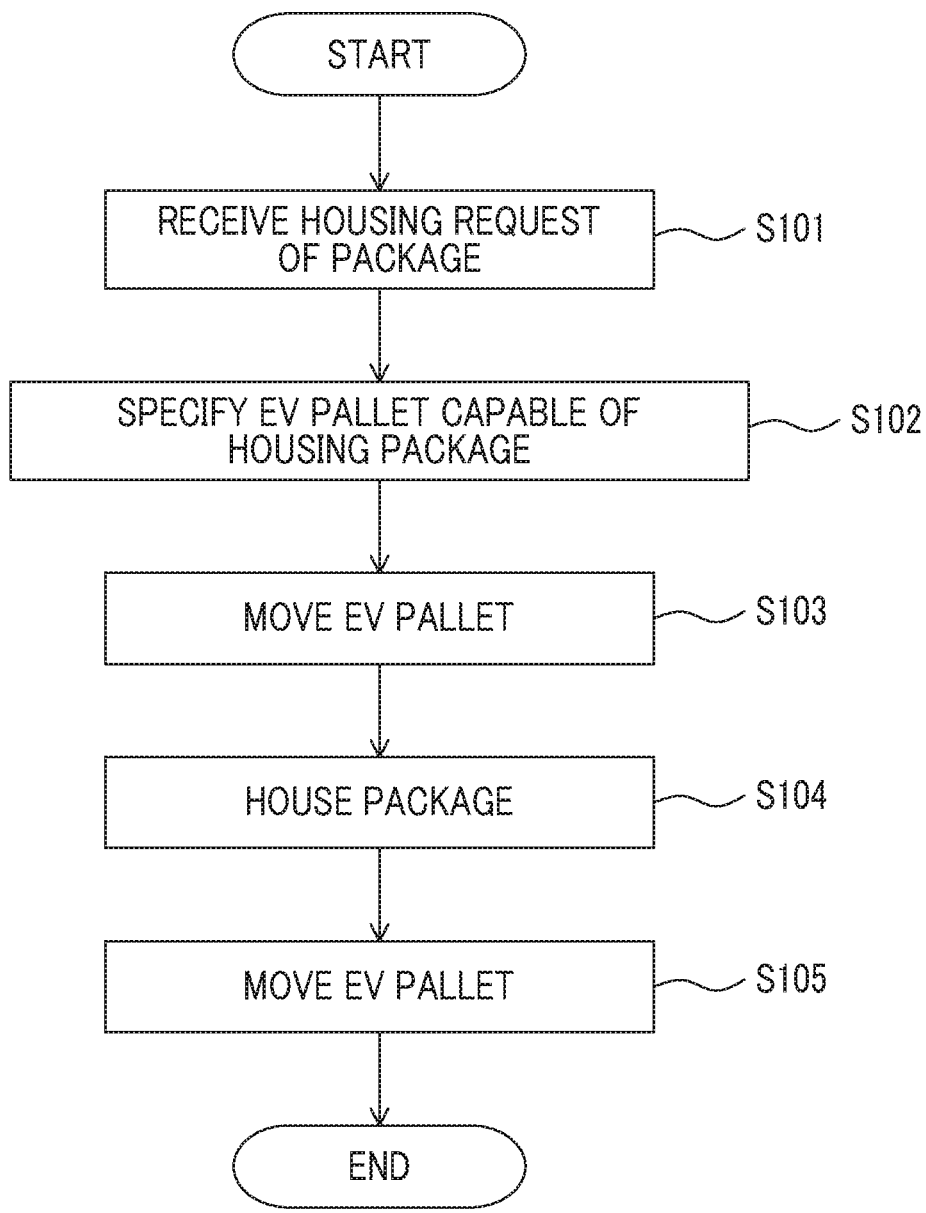

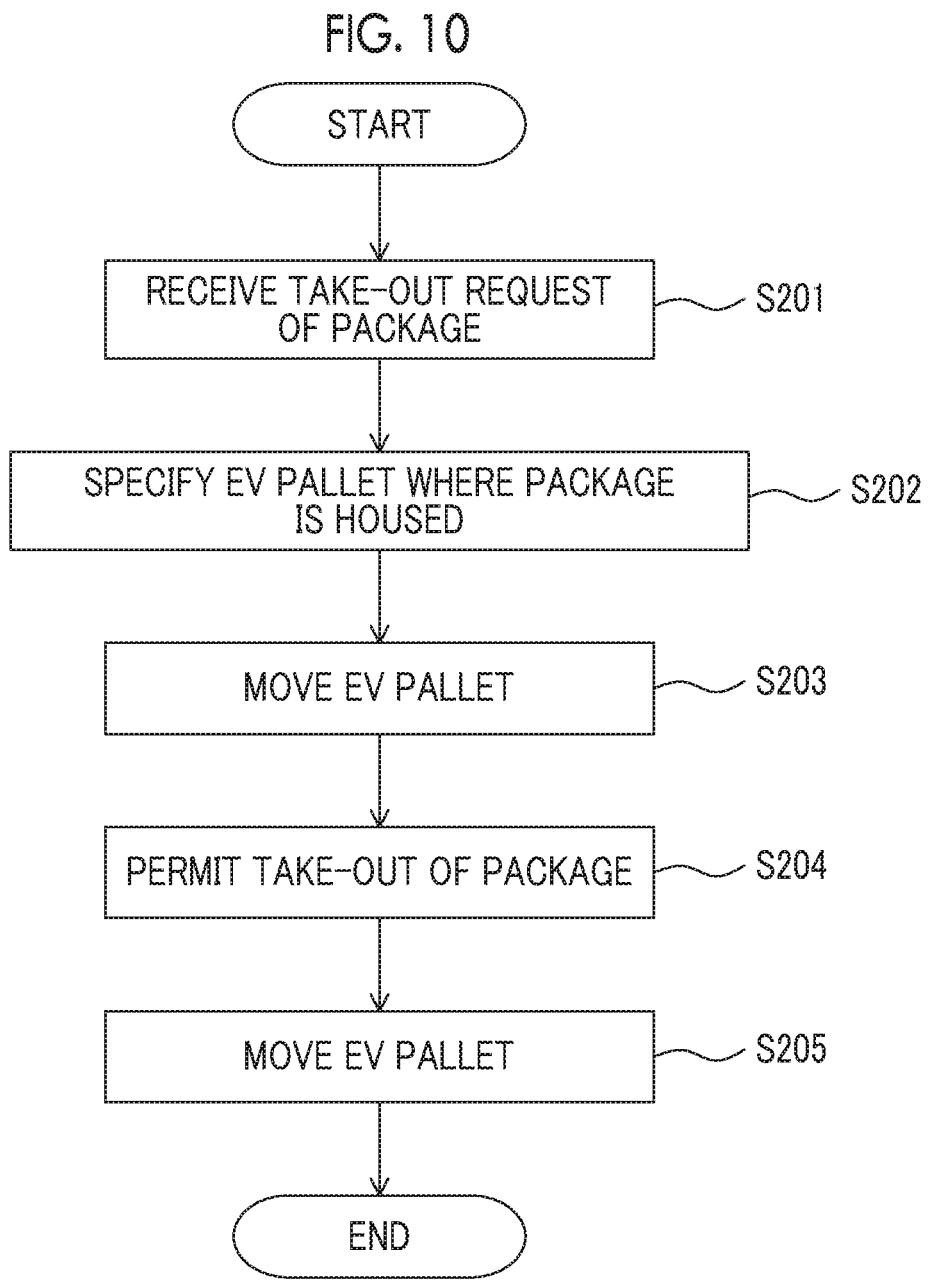

ARTICLE STORAGE SYSTEM, INFORMATION PROCESSING APPARATUS, AND INFORMATION PROCESSING METHOD

CROSS-REFERENCE TO RELATED APPLICATION

This application claims priority to Japanese Patent Application No. 2018-014028 filed on Jan. 30, 2018, incorporated herein by reference in its entirety.

BACKGROUND

1. Technical Field

The present disclosure relates to an article storage system, an information processing apparatus for use in the article storage system, and an information processing method for use in the article storage system.

2. Description of Related Art

In the related art, a so-called trailer house has been suggested as a mobile room (Japanese Unexamined Patent Application Publication No. 2017-081557 (JP 2017-081557 A)). Furthermore, a technique that achieves efficiency of storage or conveyance of an article in a trunk room as a storage for rent has been suggested (Japanese Unexamined Patent Application Publication No. 2008-030942 (JP 2008-030942 A), Japanese Unexamined Patent Application Publication No. 2004-171473 (JP 2004-171473 A), Japanese Unexamined Patent Application Publication No. 2002-279050 (JP 2002-279050 A), and Japanese Unexamined Patent Application Publication No. 2004-100233 (JP 2004-100233 A)).

SUMMARY

However, in the related art described above, when a user houses an article in a storage or takes out an article stored in the storage, there is a possibility that a time is needed to house or take out an article since an article is conveyed using a carrier, the user goes to the storage to take out an article, or the like.

The present disclosure realizes a trunk room that needs little time for housing or taking out an article using a moving object.

A first aspect of the present disclosure relates to an article storage system. The article storage system includes a moving object and a server. The moving object is configured to house an article, and move on a road. The server is configured to manage information of the moving object and information of a user who uses the moving object, store user identification information for identifying the user and moving object identification information for identifying the moving object to be used by the user in association with each other, acquire a request from the user relating to housing of the article in the moving object or take-out of the article from the moving object, and when the request from the user is acquired, specify the moving object to be used by the user based on the user identification information and the moving object identification information and perform control such that the specified moving object moves from a predetermined place on the road to a place that is different from the predetermined place.

In the article storage system according to the first aspect of the present disclosure, the different place may be a place where the user houses the article in the moving object or takes out the article from the moving object.

In the article storage system according to the first aspect of the present disclosure, the server may be configured to perform control such that the specified moving object moves from the different place to the predetermined place after the article is housed in the moving object or the article is taken out from the moving object.

With the article storage system according to the first aspect of the present disclosure, when the user houses an article in the moving object or takes out an article from the moving object while using the moving object as a storage at a remote location, the user does not go toward the remote location, and the moving object can be made to move to a place where the user easily accesses the moving object, such as an urban area. Accordingly, a time needed to house or take out the article using the moving object can be expected to be reduced compared to a time needed to house or take out an article using a trunk room in the related art. The moving object is a moving object that performs autonomous moving under the control of the server. The moving object may be an autonomous driving vehicle.

A second aspect of the present disclosure relates to an information processing apparatus configured to control a moving object. The moving object is configured to house an article and move on a road. The information processing apparatus includes a server. The server is configured to manage information of the moving object and information of a user who uses the moving object, store user identification information for identifying the user and moving object identification information for identifying the moving object to be used by the user in association with each other, acquire a request from the user relating to housing of the article in the moving object or take-out of the article from the moving object, and when the request from the user is acquired, specify the moving object to be used by the user based on the user identification information and the moving object identification information and perform control such that the specified moving object moves from a predetermined place on the road to a place that is different from the predetermined place.

In the information processing apparatus according to the second aspect of the present disclosure, the different place may be a place where the user houses the article in the moving object or takes out the article from the moving object.

In the information processing apparatus according to the second aspect of the present disclosure, the server may be configured to perform control such that the specified moving object moves from the different place to the predetermined place after the article is housed in the moving object or the article is taken out from the moving object.

A third aspect of the present disclosure relates to an information processing method for causing an information processing apparatus including a server to control a moving object. The moving object is configured to house an article and move on a road. The information processing method includes, with the server, managing information of the moving object and information of a user who uses the moving object, with the server, storing user identification information for identifying the user and moving object identification information for identifying the moving object to be used by the user in association with each other, with the server, acquiring a request from the user relating to housing of the article in the moving object or take-out of the article from the moving object, and with the server, when the request from the user is acquired, specifying the moving object to be used by the user based on the user identification information and the moving object identification information and performing control such that the specified moving object moves from a predetermined place on the road to a place that is different from the predetermined place.

In the information processing method according to the third aspect of the present disclosure, the different place may be a place where the user houses the article in the moving object or takes out the article from the moving object.

The information processing method according to the third aspect of the present disclosure may further include performing control such that the specified moving object moves from the different place to the predetermined place after the article is housed in the moving object or the article is taken out from the moving object.

According to the aspects of the present disclosure, it is possible to realize a trunk room that needs little time for housing or taking out an article using a moving object.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 6 is a block diagram showing an example of the logical configuration of the management server according to the embodiment;

FIG. 7 is a table showing an example of the configuration of a pallet management table according to the embodiment;

FIG. 8 is a table showing an example of the configuration of a pallet rent table according to the embodiment;

FIG. 9 is a flowchart showing an example of housing processing of an article according to the embodiment; and FIG. 10 is a flowchart showing an example of take-out processing of an article according to the embodiment.

DETAILED DESCRIPTION

Figure 1:
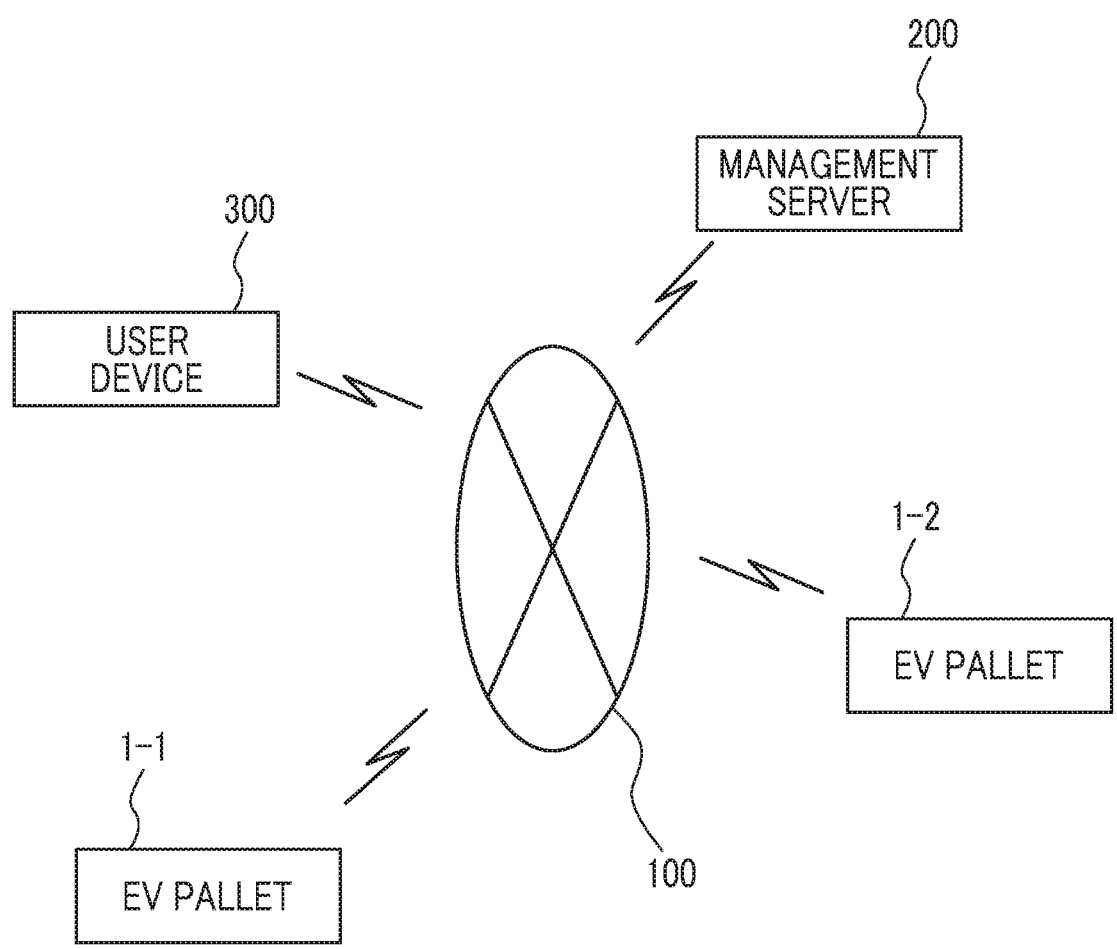
FIG. 1 is a system schematic view showing an article storage system according to an embodiment.

Hereafter, an article storage system according to an embodiment will be described referring to the drawings.

EV Pallet

In the embodiment, an autonomous traveling type electrified vehicle, called an electric vehicle (EV) pallet, provides a user with various functions or services in cooperation with a computer system on a network. The EV pallet (hereinafter, simply referred to as an "EV pallet") of the embodiment is a moving object capable of autonomous driving and unmanned driving, and there are EV pallets having various sizes according to uses. That is, for example, various EV pallets including a small EV pallet capable of being used instead of a suitcase and a large EV pallet capable of conveying a person or an article can be used.

The EV pallet has an information processing apparatus and a communication device that are provided for control of the EV pallet, a user interface with a user who uses the EV pallet, and exchange of information with various servers on a network. The EV pallet provides the user with functions and services to be added by various servers on the network in cooperation with various servers on the network, in addition to processing to be executable by the EV pallet alone.

The EV pallet is a multipurpose moving object that is capable of changing functions provided for each individual and is a vehicle that autonomously travels on a road. The EV pallet that is used in the article storage system of the embodiment is intended to deposit or receive a package, such as an article, from the user at a predetermined destination in response to a user's request. In this case, while the predetermined destination is designated by the user, a route to the destination may be designated by the user or may be appropriately decided by a management server in the article storage system. The EV pallet may be a moving object that the user drives or assists to driving depending on situations.

Configuration

FIG. 1 shows the configuration of the article storage system according to the embodiment. The article storage system has a plurality of EV pallets 1-1, 1-2, a network 100, a management server 200, and a user device 300. Hereinafter, the EV pallets 1-1 and the like are simply and collectively referred to as an EV pallet 1 when there is no need for individual distinction. The EV pallets 1, the management server 200, and the user device 300 are connected to one another through the network 100.

In the embodiment, the EV pallet 1 is a moving object capable of autonomous driving and traveling and unmanned driving and traveling for conveying a package. The EV pallet 1 has a user interface under computer control, receives a request from the user, responds to the user, executes predetermined processing to the request from the user, and reports a processing result to the user. For example, the EV pallet 1 receives an instruction of the user from a voice, an image, or information from input/output equipment of the computer and executes processing. The EV pallet 1 recognizes the user from the image, the voice, or the like of the user and follows the user with movement of the user.

The user accesses the management server 200 through the user interface of the EV pallet 1, the user device 300, or the like before use of the EV pallet 1 and requests the use of any EV pallet 1 to the management server 200. In response to the request, the management server 200 registers the relationship between the user and the EV pallet 1 to be used by the user and permits the user to use the EV pallet 1. In the embodiment, the EV pallet 1 that is permitted to be used by the user and that the relationship between the user and the EV pallet 1 to be used by the user is registered in the management server 200 is referred to as my pallet.

The network 100 is a public communication network, and for example, the internet is exemplified. The network 100 may include a wired communication network and a wireless communication network. The wireless communication network is, for example, a communication network of each mobile phone company. Note that, a wireless local area network (LAN) or the like may be included in a part of the wireless communication network. The wired communication network is a communication network that is provided by a carrier of a communication network. Note that, the wired communication network may include a wired LAN.

The management server 200 provides the user with various kinds of processing, functions, or services in cooperation with the EV pallet 1 registered as my pallet. In the embodiment, the management server 200 controls the EV pallets 1 in response to an instruction from the user device 300 and realizes movement to a designated destination, reception of a package, transportation, housing, hand-over, and the like using the EV pallet 1.

The user device 300 is, for example, a mobile phone, a smartphone, a portable information terminal, a tablet terminal, a personal computer, or the like. The user device 300 receives a request from the user, responds to the user, executes predetermined processing to the request from the user, and reports a processing result to the user. The user device 300 cooperates with the EV pallet 1 or accesses the management server 200 instead of the user interface of the EV pallet 1 and provides the user with various kinds of processing, functions, and services.

Figure 2:
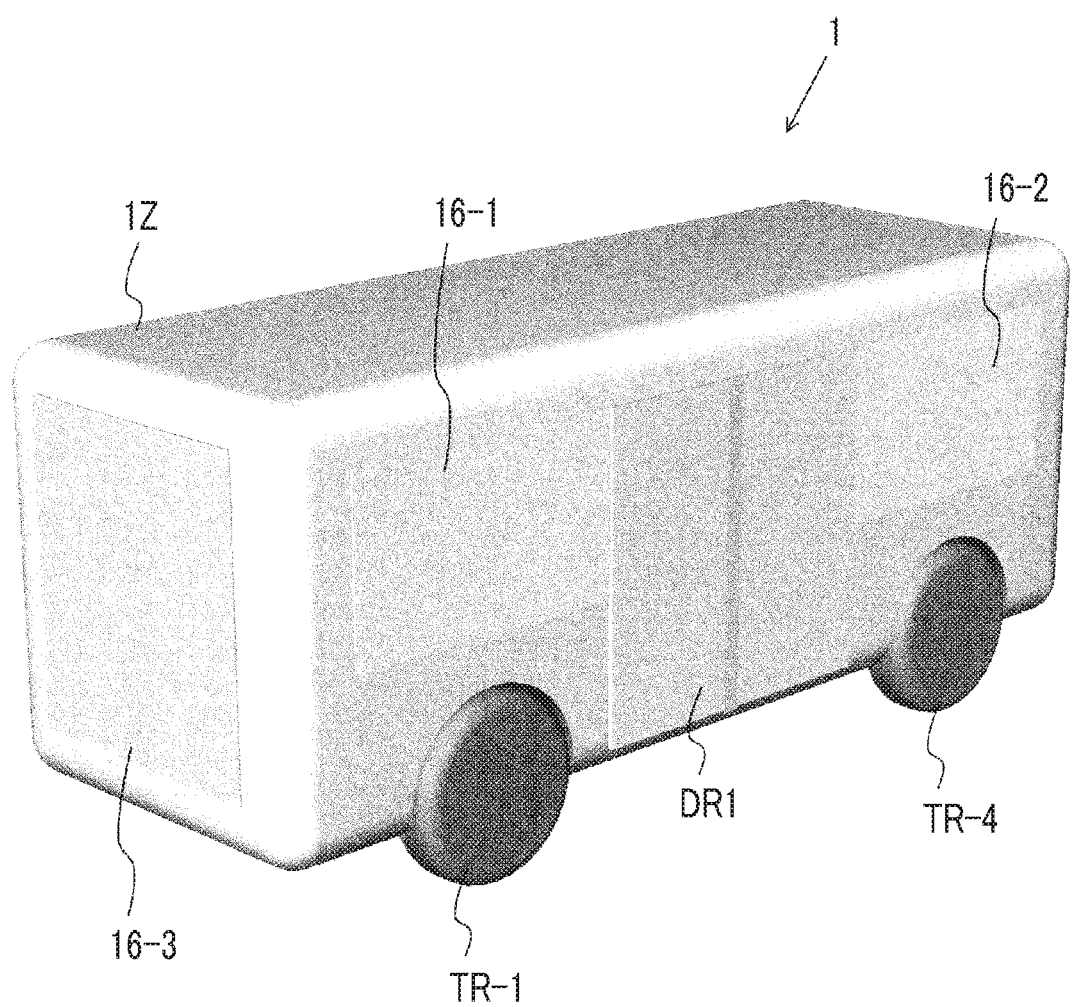
FIG. 2 is a perspective view showing an example of the appearance of an EV pallet according to the embodiment.
Figure 3:
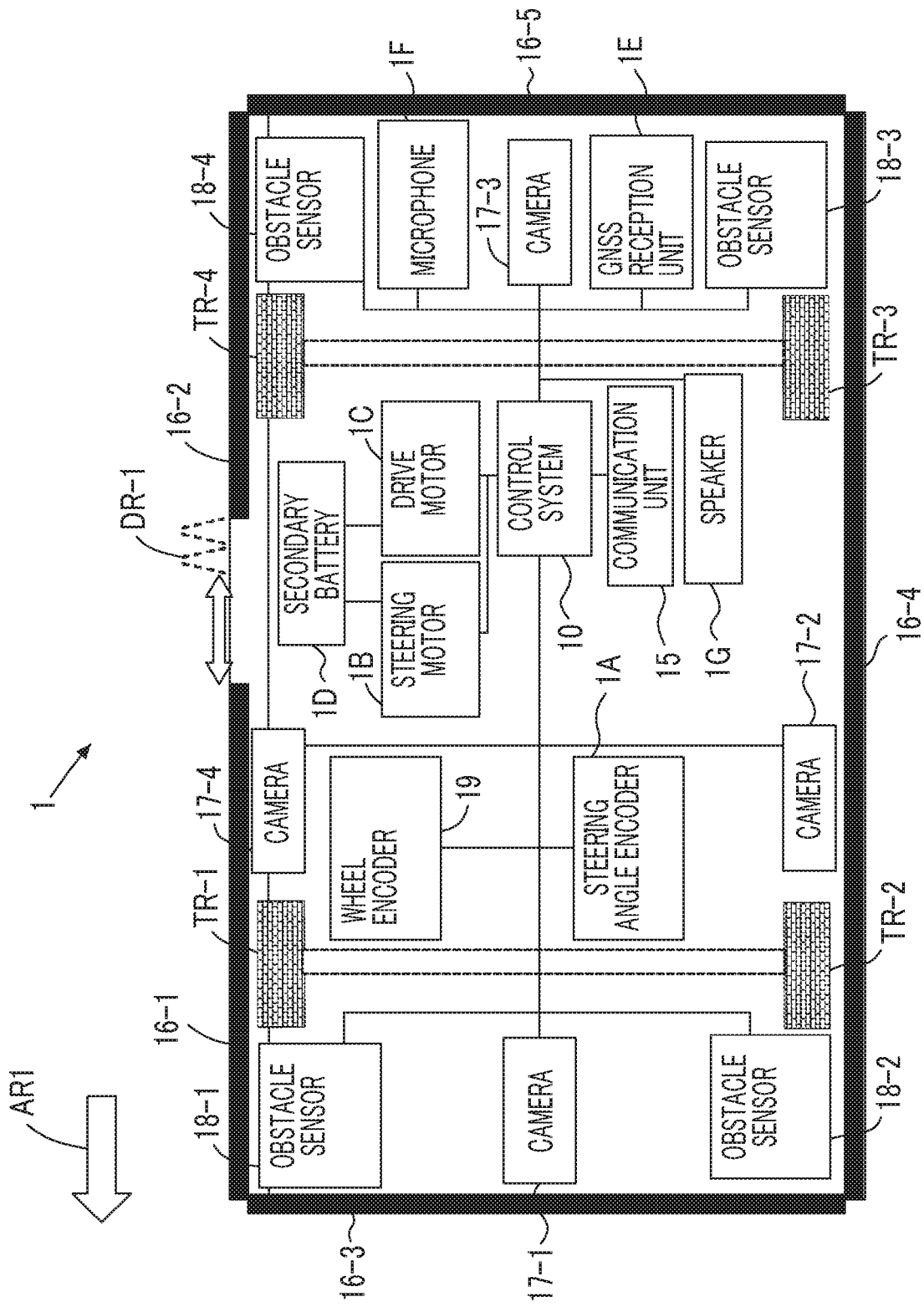
FIG. 3 is a plan view showing an example of arrangement of units of the EV pallet according to the embodiment when the EV pallet is viewed from below.
Figure 4:
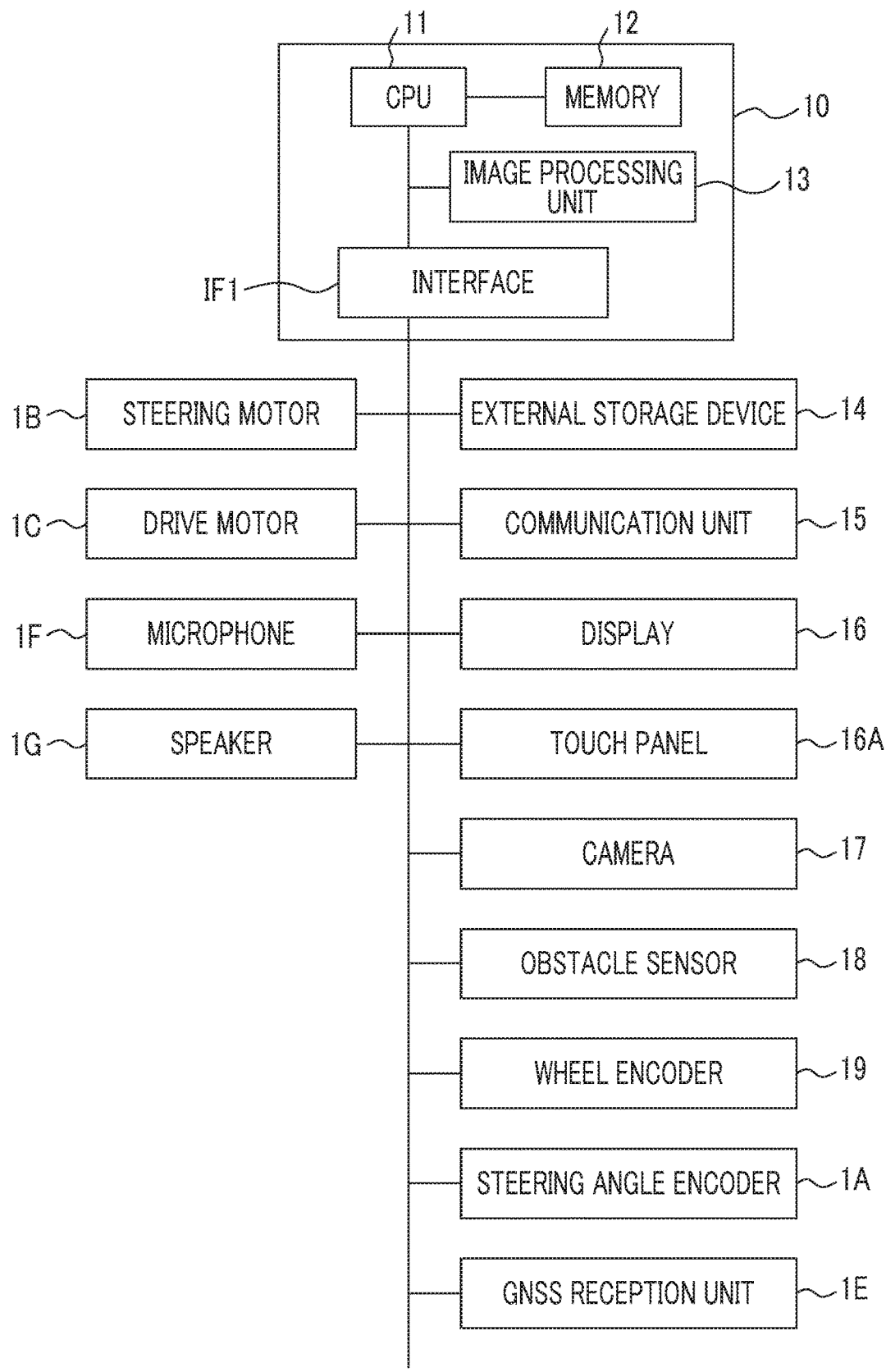
FIG. 4 is a diagram illustrating the configurations of a control system according to the embodiment and units related to the control system.

FIG. 2 is a perspective view illustrating the appearance of the EV pallet 1. FIG. 3 is a plan view showing arrangement of a sensor, a display, a drive device, and a control system mounted in the EV pallet 1 when the EV pallet 1 is viewed from below. FIG. 4 is a diagram illustrating the configurations of a control system 10 and units related to the control system 10.

The EV pallet 1 has a box-shaped body 1Z and four wheels TR-1, TR-2, TR-3, TR-4 provided in front and rear on both sides below the body 1Z. The four wheels TR-1 to TR-4 are coupled to a drive shaft (not shown) and are driven by a drive motor 1C illustrated in FIG. 3. A moving direction of the four wheels TR-1 to TR-4 during traveling (a direction parallel to (or a direction perpendicular to) the rotating surface of each of the four wheels TR-1 to TR-4) is displaced relatively with respect to the body 1Z by a steering motor 1B illustrated in FIG. 3, and a moving direction of the EV pallet 1 is controlled.

As in FIGS. 2 and 3, displays 16-1, 16-2, 16-3, 16-4, 16-5 are fixed to the outer wall of the body 1Z of the EV pallet 1. The displays 16-1 to 16-5 are, for example, liquid crystal displays, electroluminescence panels, or the like.

In FIG. 3, it is assumed that the EV pallet 1 is moving in a direction of an arrow AR1. Accordingly, a left direction of FIG. 3 is a moving direction. Then, in FIG. 3, a side surface of the body 1Z in the moving direction is referred to as a front surface of the EV pallet 1, and a side surface in a direction opposite to the moving direction is referred to as a rear surface of the EV pallet 1. A side surface on a right side with respect to the moving direction of the body 1Z is referred to as a right side surface, and a side surface on a left side is referred to as a left side surface.

As in FIG. 3, the EV pallet 1 has obstacle sensors 18-1, 18-2 on both sides of the front surface, and has obstacle sensors 18-3, 18-4 on both sides of the rear surface. The EV pallet 1 has cameras 17-1, 17-2, 17-3, 17-4 in the front surface, the left side surface, the rear surface, and the right side surface, respectively. The EV pallet 1 has a steering motor 1B, a drive motor 1C, and a secondary battery D. Furthermore, the EV pallet 1 has a wheel encoder 19 that acquires a rotation angle of each wheel, and a steering angle encoder 1A that detects a steering angle as a traveling direction of the wheels. In addition, the EV pallet 1 has a control system 10, a communication unit 15, and a global navigation satellite system (GNSS) reception unit 1E.

The control system 10 is also referred to as an electronic control unit (ECU). As in FIG. 4, the control system 10 has a CPU 11, a memory 12, an image processing unit 13, and an interface IF1. An external storage device 14, the communication unit 15, the display 16, the touch panel 16A, a camera 17, an obstacle sensor 18, the wheel encoder 19, the steering angle encoder 1A, the steering motor 1B, the drive motor 1C, the GNSS reception unit 1E, a microphone 1F, and a speaker 1G, and the like are connected to the interface IF1.

In the embodiment, the obstacle sensor 18-1 and the like are collectively referred to as the obstacle sensor 18 when there is no need for individual distinction. The obstacle sensor 18 is an ultrasonic sensor, a radar, or the like. The obstacle sensor 18 emits an ultrasonic wave in a detection target direction and detects the presence, position, relative speed, and the like of an obstacle in the detection target direction based on a reflected wave. Furthermore, in the embodiment, the cameras 17-1, 17-2, 17-3, 17-4 are collectively referred to as the camera 17 when there is no need for individual distinction. The camera 17 is an imaging device constituted of an image sensor, such as charged-coupled devices (CCD), metal-oxide-semiconductor (MOS), or complementary metal-oxide-semiconductor (CMOS). The camera 17 acquires images at a predetermined time interval and stores the images in a frame buffer (not shown) in the control system 10.

The steering motor 1B controls an angle of a rotation axis of the wheel within the horizontal plane to be a moving direction with the rotation of the wheel in response to an instruction signal from the control system 10. The drive motor 1C drives and rotates, for example, the wheels TR-1 to TR-4 in response to an instruction signal from the control system 10. Note that, the drive motor 1C may drive a pair of wheels TR-1, TR-2 or another pair of wheels TR-3, TR-4 among the wheels TR-1 to TR-4. The secondary battery 1D supplies electric power to the steering motor 1B and the drive motor 1C.

The steering angle encoder 1A detects the angle of the rotation axis of the wheel within the horizontal plane to be the moving direction with the rotation of the wheel at a predetermined detection time interval and stores the angle in a register (not shown) of the control system 10. For example, an origin is set at an angle between a direction orthogonal to the rotation axis of the wheel and the moving direction (the arrow AR1 direction) in FIG. 3. Furthermore, the wheel encoder 19 acquires a rotation speed of wheel at a predetermined detection time interval and stores the rotation speed in the register (not shown) of the control system 10.

The communication unit 15 performs communication with various servers on the network 100 through a mobile phone base station and a public communication network connected to the mobile phone base station. The GNSS reception unit 1E receives an electric wave of a time signal from each of a plurality of artificial satellites revolving around the earth and stores the electric wave of the time signal in the register (not shown) of the control system 10. The microphone 1F detects a voice, converts the voice to a digital signal, and stores the digital signal in the register (not shown) of the control system 10.

The CPU 11 of the control system 10 executes a computer program developed to be executable in the memory 12 and executes processing as the control system 10. The memory 12 stores the computer program to be executed on the CPU 11, data to be processed by the CPU 11, and the like. The memory 12 is, for example, a dynamic random access memory (DRAM), a static random access memory (SRAM), a read only memory (ROM), and the like. The image processing unit 13 cooperates with the CPU 11 and processes data of a frame to be obtained from the camera 17 at each predetermined frame time interval. The image processing unit 13 has, for example, a graphics processing unit (GPU) and an image memory to be the frame buffer. The external storage device 14 is a nonvolatile storage device, and is, for example, a solid state drive (SSD), a hard disk drive, or the like.

For example, as in FIG. 4, the control system 10 acquires detection signals from the units and the sensors of the EV pallet 1 through the interface IF1. The control system 10 calculates a latitude and a longitude indicating a position on the earth based on a detection signal from the GNSS reception unit 1E. The control system 10 acquires map data from a map database stored in the external storage device 14, collates the calculated latitude and longitude with a position on the map database, and acquires a route to the destination. The control system 10 detects an obstacle in the vicinity of the EV pallet 1 based on signals from the obstacle sensor 18, the camera 17, and the like, decides a moving direction so as to avoid the obstacle, and controls a steering angle.

The control system 10 cooperates with the image processing unit 13, processes images acquired from the camera 17 for each frame, detects change based on the difference between the images, for example, and recognizes an obstacle. The control system 10 recognizes a user based on a signal from the camera 17, maintains a distance from the user to a predetermined interval, and follows movement of the user. The control system 10 recognizes a gesture of the user based on a signal from the camera 17 and responds to the intention of the user obtained from the recognized gesture. The control system 10 analyzes a voice signal obtained from the microphone 1F and responds to the analyzed intention of the user. The control system 10 may transmit data of each frame of the images from the camera 17 and voice data obtained from the microphone 1F from the communication unit 15 to the management server 200 on the network 100. Then, analysis of data of each frame of the images and voice data may be assigned to the management server 200.

In FIG. 4, although the interface IF1 is illustrated, exchange of a signal between the control system 10 and a control target is not always limited to the interface IF1. That is, the control system 10 may have a plurality of signal exchange paths other than the interface IF1. In FIG. 4, the control system 10 has the single CPU 11. Note that, the CPU is not always limited to a single processor and may have a multi-processor configuration. A single CPU that is connected with a single socket may have a multi-core configuration. At least a part of the processing of the units described above may be executed by a processor other than the CPU, for example, a dedicated processor, such as a digital signal processor (DSP) or a graphics processing unit (GPU). At least a part of the processing of the units may be an integrated circuit (1C) or other digital circuits. An analog circuit may be included in at least a part of the units.

Figure 5:
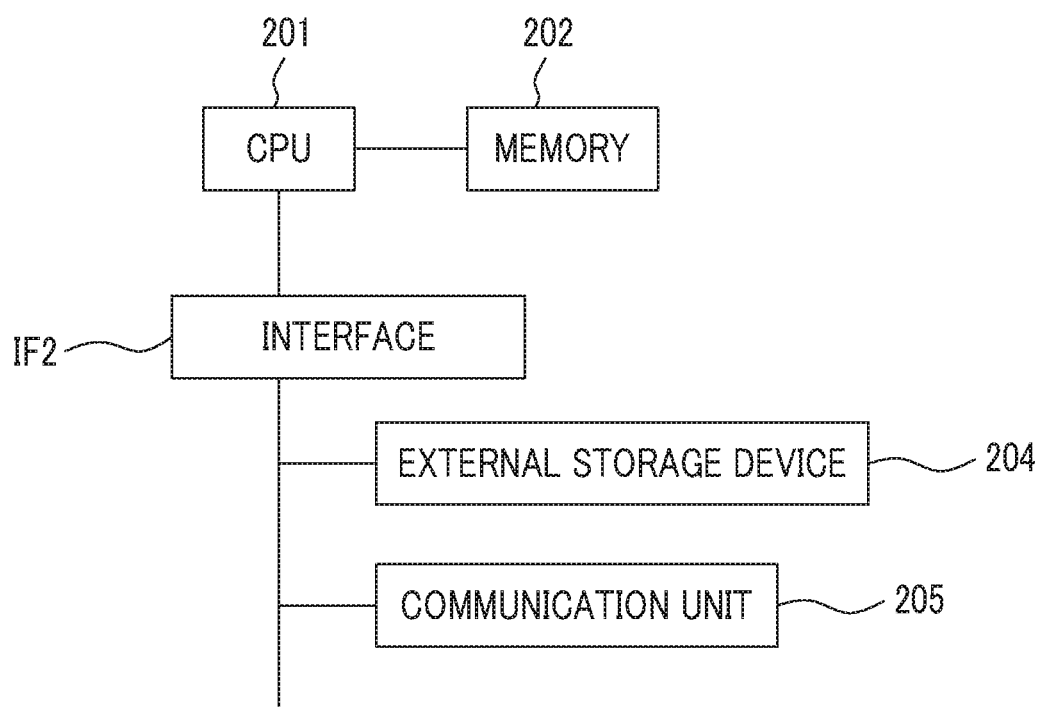
FIG. 5 is a diagram showing the hardware configuration of a management server according to the embodiment.

FIG. 5 is a diagram illustrating the hardware configuration of the management server 200. The management server 200 has a CPU 201, a memory 202, an interface IF2, an external storage device 204, and a communication unit 205. The configurations and operations of the CPU 201, the memory 202, the interface IF2, the external storage device 204, and the communication unit 205 are the same as those of the CPU 11, the memory 12, the interface IF1, the external storage device 14, and the communication unit 15 of FIG. 4. The configuration of the user device 300 is the same as that of the management server 200 of FIG. 5. Note that, the user device 300 may have, for example, a touch panel as an input unit that receives a user's operation. The user device 300 may have a display and a speaker as an output unit that provides the user with information.

FIG. 6 is a block diagram illustrating the logical configuration of the management server 200. The management server 200 operates as a processing unit illustrated in FIG. 5 with a computer program on the memory 202. That is, the management server 200 has a request reception unit 211, a specification unit 212, a response unit 213, a pallet management database 214, a user management database 215, a package management database 216, and a map information database 217.

The request reception unit 211 receives a request from the EV pallet 1 through the communication unit 205. The request from the EV pallet 1 is a request for processing that the EV pallet 1 alone hardly executes, for example, processing to be executed with reference to the pallet management database 214, the user management database 215, and the package management database 216.

The specification unit 212 executes search or the like for data from the pallet management database 214, the user management database 215, and the package management database 216. Then, the specification unit 212 performs specification of an EV pallet to be used by the user, specification of a package housed in the EV pallet, specification of a destination to be a moving destination of the EV pallet, and the like. The response unit 213 responds to the EV pallet 1 with a search result of data in the specification unit 212 from the pallet management database 214, the user management database 215, and the package management database 216.

The pallet management database 214 is a database that manages information related to the EV pallet 1 to be managed by the article storage system of the embodiment. The user management database 215 is a database that manages information, such as a user ID of the user who uses the article storage system of the embodiment. The package management database 216 is a database that manages a package housed in the EV pallet 1 to be used as my pallet by each user.

Data Example

FIG. 7 illustrates the configuration of a pallet management table of the pallet management database 214. The pallet management table holds classification, use, and other characteristics of the EV pallet 1 that belongs to the article storage system of the embodiment. In FIG. 7, each row of the table corresponds to one EV pallet 1. The pallet management table has fields of pallet ID, classification, size, loadage, and storage position.

The pallet ID is identification information (in the drawing, "PIDN1") for uniquely identifying the EV pallet 1 in the article storage system of the embodiment. The classification is information for specifying a type of a package housable in the EV pallet 1. For example, the classification is the size of a package housable in the EV pallet, or the like. In FIG. 7, although the classification is illustrated by a text string (in the drawing, "TRUNK A"), the classification may be designated by a code, a number, or the like. The size is the dimension, capacity, and the like of the EV pallet. The size is designated, for example, width (W), height (H), and depth (D) (in the drawing, "W, H, D"). Note that, the size may be specified, for example, the capacity of the EV pallet 1 (for example, cubic meter or the like). The loadage is a weight (in the drawing, "G1") housed in the EV pallet 1. In the embodiment, the EV pallet 1 is on standby in a base determined in advance. As an example of the base, a parking space of the EV pallet 1 or a place where a restriction of traffic volume or the like is considered to be reduced is exemplified. The storage position is positional information (in the drawing, "P1"), such as the latitude and longitude of the base where the EV pallet 1 is on standby. The base is an example of a predetermined place that the EV pallet 1 is reachable while moving on a road.

FIG. 8 illustrates the configuration of a pallet rent table of the pallet management database 214. The pallet rent table is a table that records the relationship between the EV pallet 1 and the user who uses the EV pallet 1. In the table of FIG. 8, one row is a record indicating the relationship between the user and the EV pallet 1 in single rent of the EV pallet 1. The pallet rent table has fields of pallet ID, user ID, rent start date, expected return date, and rent end date. The pallet management database 214 is an example of a management unit that stores user identification information for identifying the user and moving object identification information for identifying the EV pallet 1 in association with each other.

The pallet ID of the pallet rent table is identification information for identifying the EV pallet 1 as a rent management target, and is the same information as the pallet ID defined in the pallet management table. The user ID is identification information (in the drawing, "USR1") for identifying the user who uses the EV pallet 1. The rent start date is start date (in the drawing, "YMD1") on which the EV pallet 1 specified by the pallet ID is rented to the user specified by the user ID. The expected return date is an expected return date (in the drawing, "YMD2") that is applied by the user at the time of rent of the EV pallet 1. The expected return date may be undecided. The rent end date is date (in the drawing, "YMD3") on which the EV pallet 1 specified by the pallet ID is returned from the user specified by the user ID.

Processing Flow

Hereinafter, a processing flow in the article storage system of the embodiment will be described referring to FIG. 9. In the embodiment, the management server 200 executes processing of FIG. 9, whereby the EV pallet 1 to be used by the user is moved to a destination that is designated by a user's operation on the user device 300 and is a place different from the above-described base. The user deposits a package in a housing space of the EV pallet 1 having moved to the destination. When housing of the package in the EV pallet 1 is completed, the EV pallet 1 returns to the base.

First, the user operates the user device 300 to request housing of the package in the EV pallet 1. Then, the management server 200 functions as a reception unit that receives the request from the user and receives the request for housing of the package in the EV pallet 1 from the user device 300 (S101). In the request to be transmitted from the user device 300, the user ID, information (article name, size, weight, and the like) relating to the package to be housed, and information of a destination as a moving destination of the EV pallet 1 are also included. Such information may be transmitted along with the request for housing of the package or may be transmitted separately from the request. When the request for housing of the package is received from the user device 300, the management server 200 functions as a specification unit that specifies a moving object to be used by the user and specifies the EV pallet 1 usable on current date to be date between the rent start date and the expected return date, that is, the EV pallet 1 currently usable by the user among the EV pallets 1 associated with the user ID based on the received user ID or information of each table of the pallet management database 214 (S102).

When the EV pallet 1 is specified, the management server 200 functions as a moving controller that controls and moves the moving object, and gives the specified EV pallet 1 an instruction to move the destination as the moving destination of the EV pallet 1 received along with the above-described request. In S102, when a plurality of EV pallets 1 is specified, the management server 200 selects the EV pallet 1 capable of housing the package based on information relating to the package. The specified (selected) EV pallet 1 performs autonomous traveling under control based on the instruction received from the management server 200. The EV pallet 1 generates a traveling route based on an operation command received from the management server 200 through wireless communication, autonomously travels on the road using an appropriate method while sensing the vicinity of the EV pallet 1, and moves to the instructed destination (S103).

In a case of autonomous traveling on the road, for example, the EV pallet 1 acquires an operation command from the management server 200 and generates an operation plan of the host vehicle. The operation plan is data that defines a route, along which the EV pallet 1 travels, and processing to be executed by the EV pallet 1 in a part or the whole of the route. As an example of data included in the operation plan, for example, the following is exemplified.

(1) Data Representing Traveling Route of Host Vehicle by Set of Road Links

The traveling route of the host vehicle may be automatically generated based on given departure place and destination with reference to map data stored in a database (not shown), for example. Alternatively, the traveling route may be generated using an external service.

(2) Data Representing Processing to be Executed by Host Vehicle at Point on Route The processing to be executed by the host vehicle is, for example, "making a person get in", "unloading a package, "collecting data", and "outputting video", but is not limited thereto. The generated operation plan is transmitted to the control system 10.

The control system 10 detects an environment in the vicinity of the host vehicle based on data acquired by the obstacle sensor 18 or the camera 17. A detection target is, for example, the number or positions of lanes, the number or positions of vehicles in the vicinity of the host vehicle, the number or positions of obstacles (for example, pedestrians, bicycles, structures, buildings, or the like) in the vicinity of the host vehicle, a structure of a road, road signs, or the like, but is not limited thereto. Any detection target may be applied as long as the detection target is needed to perform autonomous traveling. The control system 10 may track a detected object. For example, the difference between coordinates of an object detected before one step and current coordinates of the object can be used to obtain a relative speed of the object.

Then, the control system 10 controls traveling of the host vehicle based on the generated operation plan, environment data, or positional information of the host vehicle. For example, the host vehicle is allowed to travel along a predetermined route and is made to travel such that an obstacle does not enter within a predetermined safety zone centering on the host vehicle. In regard to a method of making the vehicle perform autonomous traveling, a known method can be employed.

When the EV pallet 1 has moved to the destination, the EV pallet 1 is on standby at the destination, performs authentication of the user, unlocking and locking of a door DR1, and the like through short-range wireless communication with the user device 300 carried with the user who has arrived at the destination, and allows the user to house the package in the EV pallet 1 (S104). As an example, the EV pallet 1 has a key unit (not shown) having the same wireless interface as a smart key (a portable device of a smart entry system). The key unit performs short-range wireless communication with the user device 300 and decides whether or not the key unit serves as a key (vehicle operation device) of the EV pallet 1 based on an authentication result of the user device 300. That is, the user operates the user device 300 from the outside of the EV pallet 1, thereby performing locking and unlocking of the vehicle or other vehicle operations.

When housing of the package in the EV pallet 1 is completed, the EV pallet 1 notifies the management server 200 to the effect that housing of the package is completed. The management server 200 stores, in the package management database 216, information indicating that the package is housed in the EV pallet 1, based on information of the package received in S101. The EV pallet 1 restarts to move through autonomous traveling under control based on an instruction received from the management server 200 and returns to the base (S105).

Next, processing that is executed by the management server 200 when the user takes out the package housed in the EV pallet 1 through the above-described processing will be described referring to a flowchart illustrated in FIG. 10. First, the user operates the user device 300 to request take-out of the package housed in the EV pallet 1. Then, the management server 200 receives the request for take-out of the package from the user device 300 (S201). Similarly to S101, in the request to be transmitted from the user device 300, the user ID, information relating to a package to be taken out, and a moving destination of the EV pallet 1 are also included. Such information may be transmitted along with the request for take-out of the package or may be transmitted separately from the request.

When the request for take-out of the package is received from the user device 300, the management server 200 specifies the EV pallet 1 associated with the user ID from information of each table of the pallet management database 214 based on the received user ID. In addition, the management server 200 specifies the EV pallet 1, in which the package to be taken out indicated by the request received in S201 is housed, based on information relating to the package housed in the EV pallet 1 stored in the package management database 216 (S202).

When the EV pallet 1 in which the package to be taken out is housed is specified, the management server 200 functions as a moving controller that controls and moves the moving object and gives the specified EV pallet 1 an instruction to move to the received moving destination of the EV pallet 1 along with the above-described request. Similarly to S103, the specified EV pallet 1 performs autonomous traveling under control based on the instruction received from the management server 200 and moves to the instructed destination (S203).

The EV pallet 1 is on standby at the moving destination, performs authentication of the user, unlocking and locking of the door DR1, and the like through short-range wireless communication with the user device 300, and permits the user to take out the package from the EV pallet 1 (S204). When the user has taken out the package from the EV pallet 1, the EV pallet 1 notifies the management server 200 to the effect that take-out of the package is completed. The management server 200 stores, in the package management database 216, information indicating that the package is taken out from the EV pallet 1, that is, the package is not housed in the EV pallet 1, based on information relating to the package received in S201. The EV pallet 1 restarts to move through autonomous traveling and returns to the base (S205).

With the above-described processing, the user can use the EV pallet 1 as a trunk room. Since the EV pallet 1 stores the housed package in the above-described base, it is possible to make the EV pallet 1 be on standby at a place where a space is easily secured, such as an outlying area apart from an urban area, instead of a place where a space for allowing the EV pallet 1 to be on standby is hardly secured, such as an urban area. Although the user goes toward the trunk room and takes out the package in the related art, in the embodiment, when the user takes out the package from the EV pallet 1, since the EV pallet 1 moves to a place designated by the user, the user does not need to go toward the storage place of the package with the EV pallet 1.

Although the embodiment has been described above, the configurations of the EV pallet, the management server, the user device, and the like or the processing is not limited to the above-described embodiment, and various alterations may be made without departing from the technical spirit of the present disclosure. For example, in the above-described embodiment, when the user operates the user device 300 to request housing of the package (S101) or when the user operates the user device 300 to request take-out of the package (S201), the user may operate the user device 300 to designate a desired arrival date, a desired arrival time, or the like at the moving destination of the EV pallet 1. In the above-described embodiment, although the user operates the user device 300 to designate the moving destination of the EV pallet 1, a place where the user houses or takes out the package in or from the EV pallet 1 may be determined in advance, and when the management server 200 receives the request for housing of the package or the request for take-out of the package from the user device 300, the EV pallet 1 may move to the determined place.

While the EV pallet 1 is on standby in the base, a manager or the like of the EV pallet 1 may detach the wheels of the EV pallet 1. When movement of the EV pallet 1 is requested, the manager or the like attaches the wheels to the EV pallet 1, whereby it is possible to reduce a possibility that the wheels or tires are deteriorated due to sunlight or weather while the EV pallet 1 is on standby in the base.

In the above-described processing, when a plurality of packages is housed in the EV pallet 1 and when the user requests take-out of any one package, the manager or the like of the EV pallet 1 may move the package, or the like and may make arrangement such that solely the requested package is conveyed by the EV pallet 1. For example, the management server 200 holds a list of packages housed in each EV pallet and updates the content of the list each time housing or take-out of the package in or from the EV pallet occurs. Then, when the user operates the user device 300 to confirm the content of the list and selects a desired package, the management server 200 performs control such that an EV pallet, in which the selected package is housed, moves to a designated destination. With this, for example, when a plurality of articles including a ski outfit is stored in a plurality of EV pallets, the user selects the ski outfit as a take-out package and designates a desired ski resort as a moving destination of the EV pallet, whereby solely the EV pallet housing the ski outfit is transported to the ski resort. The user can take out the ski outfit from the EV pallet without carrying the ski outfit.

What is claimed is:

1. An article storage system comprising:
a moving object configured to house an article, and move on a road; and
a server configured to
manage information of the moving object and information of a user who uses the moving object,
store user identification information for identifying the user and moving object identification information for identifying the moving object to be used by the user in association with each other,
acquire a request from the user relating to housing of the article in the moving object, the request from the user including a rent start date, an expected return date, and information relating to the article,
when the request from the user is acquired, specify the moving object to be used by the user for housing the article based on the user identification information, the moving object identification information, the rent start date, the expected return date, and the information relating to the article, and perform control such that the specified moving object moves from a standby point where the moving object is on standby for acquiring the request to an item housing point, different from the standby point, where the item is housed in the moving object, and after the item is housed in the moving object, the specified moving object moves from the item housing point to a base where the specified moving object is on standby with the item housed therein, and
when a plurality of the moving objects store a plurality of the articles respectively that belong to the user, a first set of the plurality of moving objects storing the articles required by the user moves from the standby point to the item housing point, and a second set of the plurality of moving objects not storing any of the articles required by the user does not move from the standby point to the item housing point.

2. The article storage system according to claim 1, wherein the housing point is a place where the user houses the article in the moving object or takes out the article from the moving object.

3. The article storage system according to claim 1, wherein the server is configured to perform control such that the moving object housing a desired package selected by the user moves.

4. The article storage system according to claim 1, wherein the server is configured to perform control such that the specified moving object stores the item at the base where the specified moving object is on standby.

5. An information processing apparatus configured to control a moving object, the moving object being configured to house an article and move on a road, the information processing apparatus comprising a server configured to
manage information of the moving object and information of a user who uses the moving object,
store user identification information for identifying the user and moving object identification information for identifying the moving object to be used by the user in association with each other,
acquire a request from the user relating to housing of the article in the moving object, the request from the user including a rent start date, an expected return date, and information relating to the article,
when the request from the user is acquired, specify the moving object to be used by the user for housing the article based on the user identification information, the moving object identification information, the rent start date, the expected return date, and the information relating to the article, and perform control such that the specified moving object moves from a standby point where the moving object is on standby for acquiring the request to an item housing point, different from the standby point, where the item is housed in the moving object, and after the item is housed in the moving object, the specified moving object moves from the item housing point to a base where the specified moving object is on standby with the item housed therein, and
when a plurality of the moving objects store a plurality of the articles respectively that belong to the user, a first set of the plurality of moving objects storing one of the articles required by the user moves from the standby point to the item housing point, and a second set of the plurality of moving objects not storing any of the articles required by the user does not move from the standby point to the item housing point.

6. The information processing apparatus according to claim 5, wherein the housing point is a place where the user houses the article in the moving object or takes out the article from the moving object.

7. The information processing apparatus according to claim 5, wherein the server is configured to perform control such that the moving object housing a desired package selected by the user moves.

8. The information processing apparatus according to claim 5, wherein the server is configured to perform control such that the specified moving object stores the item at the base where the specified moving object is on standby.

9. An information processing method for causing an information processing apparatus including a server to control a moving object, the moving object being configured to house an article and move on a road, the information processing method comprising:
with the server, managing information of the moving object and information of a user who uses the moving object;
with the server, storing user identification information for identifying the user and moving object identification information for identifying the moving object to be used by the user in association with each other;
with the server, acquiring a request from the user relating to housing of the article in the moving object, the request from the user including a rent start date, an expected return date, and information relating to the article;
with the server, when the request from the user is acquired, specifying the moving object to be used by the user for housing the article based on the user identification information, the moving object identification information, the rent start date, the expected return date, and the information relating to the article, and performing control such that the specified moving object moves from a standby point where the moving object is on standby for acquiring the request to an item housing point, different from the standby point, where the item is housed in the moving object, and after the item is housed I the moving object, the specified moving object moves from the item housing point to a base where the specified moving object is on standby with the item housed therein, and
with the server, when a plurality of the moving objects store a plurality of the articles respectively that belong to the user, a first set of the plurality of moving objects storing the articles required by the user moves from the standby point to the item housing point, and a second set of the plurality of moving objects not storing any of the articles required by the user does not move from the standby point to the item housing point.

10. The information processing method according to claim 9, wherein the housing point is a place where the user houses the article in the moving object or takes out the article from the moving object.

11. The information processing method according to claim 9, wherein the server is configured to perform control such that the moving object housing a desired package selected by the user moves.

12. The information processing method according to claim 9, further comprising, with the server, performing control such that the specified moving object stores the item at the base where the specified moving object is on standby.

* * * * *